US012056709B2

(12) United States Patent
Kishore et al.

(10) Patent No.: US 12,056,709 B2
(45) Date of Patent: Aug. 6, 2024

(54) AUTOMATED FRAUD MONITORING AND TRIGGER-SYSTEM FOR DETECTING UNUSUAL PATTERNS ASSOCIATED WITH FRAUDULENT ACTIVITY, AND CORRESPONDING METHOD THEREOF

(71) Applicant: Swiss Reinsurance Company Ltd., Zurich (CH)

(72) Inventors: Shobit Kishore, White Plains, NY (US); Jason Mark Zwanch, New York, NY (US)

(73) Assignee: Swiss Reinsurance Company Ltd., Zurich (CH)

( * ) Notice: Subject to any disclaimer, the term of this patent is extended or adjusted under 35 U.S.C. 154(b) by 249 days.

(21) Appl. No.: 17/481,088

(22) Filed: Sep. 21, 2021

(65) Prior Publication Data

US 2022/0351209 A1 Nov. 3, 2022

Related U.S. Application Data

(63) Continuation of application No. PCT/EP2021/061343, filed on Apr. 29, 2021.

(51) Int. Cl.
*G06Q 20/40* (2012.01)

(52) U.S. Cl.
CPC ..... *G06Q 20/4016* (2013.01); *G06Q 20/4014* (2013.01); *G06Q 20/407* (2013.01)

(58) Field of Classification Search
CPC ........ G06Q 40/08; G06Q 10/10; G06Q 20/32; H04L 41/12; G06N 5/02
See application file for complete search history.

(56) References Cited

U.S. PATENT DOCUMENTS

| | | | |
|---|---|---|---|
| 2014/0172439 A1* | 6/2014 | Conway | G06Q 10/10 705/2 |
| 2016/0012544 A1* | 1/2016 | Ramaswamy | G06Q 40/08 705/4 |
| 2019/0122258 A1* | 4/2019 | Bramberger | G06N 3/08 |
| 2019/0340615 A1* | 11/2019 | Hanis | G06N 5/02 |
| 2020/0167786 A1* | 5/2020 | Kursun | H04L 63/08 |
| 2020/0175517 A1* | 6/2020 | Byrne | H04L 41/12 |
| 2021/0133753 A1* | 5/2021 | Shauh | G06Q 20/32 |

* cited by examiner

Primary Examiner — Saba Dagnew
(74) Attorney, Agent, or Firm — Oblon, McClelland, Maier & Neustadt, L.L.P.

(57) ABSTRACT

An automated real-time fraud monitoring and detection system for detecting unusual and/or suspicious activities within a network of nodes interconnected by edges triggered by captured synthetic forms of social data, in particular social networking and/or linkage and/or relationship data and social metadata including at least data from microblogging services and/or social networking services by pattern recognition and matching.

28 Claims, 5 Drawing Sheets

Non-Fraudulent Networks:

Fraudulent Networks:

AUTOMATED FRAUD MONITORING AND TRIGGER-SYSTEM FOR DETECTING UNUSUAL PATTERNS ASSOCIATED WITH FRAUDULENT ACTIVITY, AND CORRESPONDING METHOD THEREOF

CROSS REFERENCE TO RELATED APPLICATION

The present application is a continuation application of International Patent Application No. PCT/EP2021/061343, filed on Apr. 29, 2021, the content of which is hereby incorporated by reference in its entirety.

FIELD OF THE INVENTION

The present invention relates to automated fraud monitoring, classification, and signaling systems identifying unusual and suspicious activity in real time using patterns recognition and/or pattern mapping of parameter values of predefined parameters in application data or measuring data. Particularly, the present invention relates to automated trigger systems using graph topology techniques in connection with a mapping process to automatically identify interrelationships between various parameter fields of a system or body of data associated with network nodes by detecting anomalous structures of the network induced by interpersonal relations in specific group situations. More particularly, the present invention relates to automated trigger or monitoring systems in connection with pattern recognition, analysis and mapping, and machine learning to improve analyses (e.g., automated analysis of data documents associated with the network node) detecting unusual structures and patterns of group or subgroup interactions within the network.

BACKGROUND OF THE INVENTION

Fraud can be defined as the use of one's occupation or technical capabilities for personal enrichment through the deliberate misuse or application of the resources, hardware devices/systems or other assets." In the technological systems, fraudulent activities have occurred in many areas of daily life such as telecommunication networks, mobile communications, on-line banking, E-commerce, and risk-transfer. Fraud is increasing dramatically with the expansion of modern technology and global communication, resulting in substantial damage to industrial processes, plants or processing lines, and further in substantial losses to whole industrial fields and businesses. Consequentially, technological developments of devices and methods for fraud detection has become an important technological issue to be explored. Automated fraud detection involves identifying and detecting fraud as quickly as possible once it has been perptrated. Typically, fraud detection methods are continuously developed to defend criminals in adapting to their strategies. The development of new fraud detection systems, devices or methods is made more difficult due to the severe limitation of the exchange of ideas in fraud detection. Data sets are not made available and results are often not disclosed to the public. The fraud cases have to be detected from the available huge data sets such as the logged data and user behavior. At present, fraud detection has been implemented by a number of implementable technics such as data mining, statistics monitoring, and artificial intelligence. Fraud can be discovered from anomalies in data and patterns. The types of frauds include, inter alia, credit card frauds, telecommunication frauds, computer intrusion, and risk-transfer fraud.

In general, the technical objective of fraud detection comprises, inter alia, to maximize correct predictions and maintain incorrect predictions at an acceptable level. A high correct diagnostic probability can be implied by minimizing the technical probability of undetected fraud and false alarms. Some technical terms are described as follows. False alarm rate (or false positive rate) is the percentage of legitimate events or attacks or transactions that are incorrectly identified as fraudulent. Fraud catching rate (or true positive rate or detection accuracy rate) is the measured percentage of detected fraudulent events/transactions that are correctly identified by the device or system as fraudulent. False Negative rate is the percentage of fraudulent events/transactions that are incorrectly identified by the device/system as legitimate. In a fraud detection system, it is important to define measurable performance metrics carefully. Several fraud detection techniques use metrics like the detection rate, false alarm rate, and average time of detection. The typical fraud detection techniques attempt to maximize accuracy rate and minimize false alarm rate.

Outlier detection is one of the technics usable in detection systems. An outlier is an observation that deviates so much from other observations as to arouse suspicion that it was generated by a different mechanism. Unsupervised learning approach can e.g. be employed to this technic. Usually, the result of unsupervised learning is a new representation of the observation data, which will then lead to improved future responses or triggers or decisions. Unsupervised methods do not need the prior knowledge of fraudulent and non-fraudulent characteristics of events/transactions in historical database, but instead detect changes in behavior or unusual events/transactions. These methods use a baseline distribution that represents normal behavior and then detect observations that show greatest departure from this norm. Outliers are a basic form of non-standard observation/monitoring that can be used for fraud detection. In supervised methods, models are trained to discriminate between fraudulent and non-fraudulent behavior so that new observations can be assigned to classes and, for example, trigger appropriate actions or signals by the system. Supervised methods require accurate identification of fraudulent events/transactions in historical databases and can only be used to detect frauds of a type that have previously occurred. An advantage of using unsupervised methods over supervised methods is that previously undiscovered types of fraud may be detected. Supervised methods are only trained to discriminate between legitimate transactions and previously known fraud. The present invention, inter alia, proposes unsupervised fraud detection, using behavioral outlier detection techniques. Abnormal linking behavior and frequency of events will be identified as outliers, which are possible fraud cases.

The technical realization of neural networks are known in prior art. A neural network is a set of inter-connected nodes designed to imitate the functioning of the human brain. Each node has a weighted connection to several other nodes in adjacent layers. Individual nodes take the input received from connected nodes and use the weights together with a simple function to compute output values. Neural networks come in many shapes and forms and can be constructed for supervised or unsupervised learning. The technical skilled person specifies the number of hidden layers as well as the number of nodes within a specific hidden layer. Depending on the technical application, the output layer of the neural network may contain one or several nodes. The present invention, inter alia, features neural networks trained with the past data of a particular customer associated with a risk-transfer. The network process can e.g. be made the current spending patterns to detect possible anomalies. In addition, the present system, inter alia, proposes a rule-based association technique combined with the neuro-adaptive approach. The inventive system can e.g. use feed-forward artificial neural network structures trained on a variant of a back-propagation training algorithm. Machine learning, adaptive pattern recognition, neural networks, and statistical modeling can e.g. be employed to develop the used predictive technics to provide a measure of certainty about whether a particular event is fraudulent. A neural MLP-based classifier is e.g. also applicable as another example using neural networks. It acts only on the information of the operation itself and of its immediate previous history, but not on historic databases of past user or risk-transfer activities. A parallel Granular Neural Net-work (GNN) technique can e.g. use fuzzy neural network and rule-based approach. The neural system can be trained in parallel using training data sets, and then the trained parallel fuzzy neural network discovers fuzzy rules for future prediction. As such, the present invention, as a variant, also introduces, inter alia, a hybrid technique, combining an expert system with a neural network to increase its statistic modeling structure and reduce the number of "false" rejections.

Further, the inventive system is, inter alia, able for anomaly detection by trying to establish a historical normal profile for each user, and then use sufficiently large deviation from the profile to indicate possible fraud. The present anomaly detection approach, inter alia, includes statistical approaches and/or predictive pattern generation, and/or neural networks. The advantage of anomaly detection is that it is possible to detect novel frauds against systems, because it compares current activities against statistical models for past behavior, not bed with specific or pre-defined patterns. However, there are some of the weaknesses of this embodiment variant. It is likely to have high rates of false alarm. Unusual but legitimate events may sometimes be considered anomalous. Statistical measures of user profile can be gradually trained, so user can train such systems over a period of time until such user behavior is considered normal. Also, the system, in this embodiment variant, sometimes may not be able to identify the specific type of attack that is occurring. Moreover, the anomaly detection systems are computationally expensive because of the overhead of keeping track of and updating several system profile metrics. The term "expert system" is defined herein as a computing system capable of representing and reasoning about some knowledge-rich domain with a view to solving problems and giving advice. Expert system detectors encode knowledge about fraudulent event as if-then rules. The present expert system approach can be used to implement fraud detection techniques that performs real-time monitoring of user activity. The present approach comprises the implementation of statistical analysis component for anomaly detection and rule-based analysis component for misuse detection.

The present invention uses, as an embodiment variant, model-based reasoning structures. The used model-based detection is a misuse detection technique that detects attacks through observable activities or user linkages that infer an fraud signature. There is a database of fraud scenarios containing a sequence of behaviors making up the fraud. The present inventive system can also combine model techniques of misuse with evidential reasoning. In this case, the system accumulates more and more evidence for an fraud attempt until a threshold is crossed; at this point, it signals a fraud attempt. A pattern matching approach to detect misuse/fraud can also be used. It uses audit trails as input under the risk-transfer environment. Further, data mining approaches can also be applied for intrusion detection in the present system. An important advantage of data mining approaches for the present system is that it can develop a new class of models to detect new frauds before they have been seen or understood by human experts. Classification model with association rules algorithm and frequent episodes is further developed for anomaly fraud detection. With the latter, the present system can automatically generate concise and accurate detection models from large amount of audit data. However, it requires a large amount of monitored data in order to be able to generate the profile rule sets. Moreover, this learning process can be implemented as an integral and continuous part of the present fraud detection system because the rule sets used by the detection module may not be static over a long period of time. Finally, the present system can also comprise state transition analysis structures. State transition analysis is a misuse detection technique, which frauds are represented as a sequence of state transitions of the monitored risk-transfer system. Actions that contribute to fraud scenarios are defined as transitions between states. fraud scenarios are defined in the form of state transition diagrams. Nodes represent system states and arcs represent relevant actions. If a compromised (final) state is ever reached, an fraud is detected to have occurred.

In summary, despite continued technological advancements in information processing and data monitoring systems, automated systems used to detect fraudulent activities, as for example in the case of automated claim handling produce complex, confusing and often erroneous recognition and detection of such activities. There is a need for automated detection and trigger systems to enable automated claims handling with trigger, detection and analysis techniques supporting the automated recognition of the validity of claims, in particular risk-transfer claims but not restricted to such claims. Some existing solutions either are only based on analysis of structured data within the claims or, where they do analysis on unstructured data, detect only abnormalities resulting from basic text and link analysis. These detection techniques have several drawbacks. For example, they may be prone to providing too many false positives. This can place the onus on human experts, as e.g. claim department personnel and special investigations units, to sift through the presented results and determine the validity of fraudulent claim detections. These state of the art techniques also tend to provide too much information to human experts responsible to screen the detection outcome. Again in this case, the onus is placed on human experts to sift through the presented detection results and determine the validity of a claim. Consequently, these techniques may even decrease a human expert's efficiency and speed of review or monitoring of fraudulent activities. Accordingly, an appropriate fraud monitoring and trigger-system that is enabled to automate monitoring and analysis techniques and providing more precise and more reliable detection results on fraudulent claim monitoring can reduce the number of false positives, while performing the analysis in comparable or shorter time as existing solutions, thus quickly and effectively segregating suspicious claims from genuine ones. Another need is for automated fraud monitoring and trigger systems to enable claims department personnel, special investigations units or law enforcement with investigation and analysis techniques and support them in detecting organized crime and repeat offenders. Often repeat offenders return into the system under pseudonyms and simple techniques focusing on single point analysis fall short. A lot of the information is hidden in unstructured data and advanced analytics techniques that mine information from unstructured data and correlate that with other sources of data such as social media data, behavioral data, social relationship data, interaction data and the like are required.

Particular problems arise from automation of risk transfer and risk pooling representing integral and technical pre-requirements for the automated operation of risk-transfer and insurance systems. Risk-transfer, i.e. insurance structures, may be defined as the provision of a link between a risk-transfer system, such as an insurance system, and an insured object or individual, also known as a policy holder, in which loss coverage is provided (e.g. by transferring compensation for the occurred and quantified loss) by the risk-transfer system by the risk-transfer system to the insured for predefined causing risk events (as accidents, hurricanes, floods etc.) in exchange of a certain premium amount periodically transferred or transferred as a lump sum by the insured in past. Whenever the insured suffers some loss for which he/she has transferred their risk, the insured may file an insurance claim to demand compensation for the loss. The insurance system pools resources in order to ensure proper operation, i.e. the pooled resources should be able to cover all claimed and quantified losses. Thus, the risk-transfer system rely on a proper risk-assessment in the context of each risk transferred. Risk assessment or measuring can e.g. be based on grouping individuals' risk, so that the risk-transfer systems are able to cover losses based on possibly future arising risks, out of a common pool of resources captured by the risk-transfer systems from associated individuals for the transfer of their risks. In some variants, in order to maintain some degree of equity among individuals exhibiting different risks, i.e., in order to derive a balance between a specific individual's transferred risk and the amount of its resources pooled in return, the risk-transfer systems capture, assess and classify the individual's risk according to appropriately selected or filtered criteria and accepted characteristics. Automated classification is the process of assigning an input pattern to one of a predefined set of classes. Classification problems exist in many real-world applications, such as medical diagnosis, machine fault diagnosis, handwriting character recognition, fingerprint recognition, and credit scoring, to name a few. Thus, classification and other risk-capturing structures are typically the basis for automated risk assessment, where the risk measure defines the amount However, if the losses are claimed e.g. fraudulent, the operation, in particular of automated systems, is corrupted. For example, the insured may claim for a compensation for which the insured is not entitled, such as the insured may deliberately plan a loss, such as theft, and car accident covered by the policy in order to receive compensation for the loss. Such situations are referred to as an insurance claim fraud. The risk-transfer claims fraud and the subrogation potential claims may occur across different risk-transfer fields (e.g. accident risks, liabilities, natural catastrophe risks, life and health risks).

According to estimates, in the sector of health and life risk-transfer alone, fraudulent claims cost risk-transfer insurance industry between $100 billion to $360 billion in the US and Europe on a yearly basis. Healthcare fraud takes on different guises including: (1) Identity theft of patients; (2) Performance of medically unnecessary services or procedures; (3) Falsifying Patients' diagnoses to justify additional tests, and overstat-ing treatment; (4) Billing for services already paid for or not rendered; and (5) Falsifying birth dates to ensure coverage for dependents. Thus, the fraud may originate with both providers and with patients. Studies show, that prior art fraud detection techniques only uncover 10% of losses because of the post-payment nature of such techniques and the resulting pay-and-chase recovery process. More recently developed fraud prevention systems attempt to use both historical and predictive techniques to help identify post-payment fraud and to identify fraud pre-payment. Fraud prevention systems have employed complex text and data recognition and analytic techniques to identify fraud, using predictive analysis structures on live claims, and applying trend analysis techniques on transferred and paid medical, surgical and drug claim histories. Other systems have looked at workflow issues and data quality between data sources including identity-matching validation. The prior art fraud prevention systems have also applied statistical analysis techniques including data correlation, development of a fraud indicator mies engine and suspect variables identification. In addition to identifying individual fraudulent acts, some fraud prevention systems identify group activities.

To stabilize and optimize their operation, efficient fraud detection systems are a technical inevitable pre-requirement for any automations of risk-transfer, especially e.g. in the medical space, thereby affecting complex technical problems as automated risk prediction and occurrence probability measurement. However, certain issues have prevented in some cases in industry to adding fraud detection systems to risk-transfer structures. Industry questions whether the added expense in terms of cost and resources will result in a net cost benefit. There are significant technical burdens and cost to the integration of the data from risk-transfer systems as well as legal compliance issues that make fraud detection systems of questionable value. Prior art fraud detection systems are often simply licensed at a fixed price and are not based on either identification of fraud or fraud avoidance. Thus, risk-transfer industry applying appropriate technology does not know whether the fraud detection will work based upon their current data and lack a way of accessing the success of a fraud detection system when the fraud detection system is implemented. There is a technological need to provide a proper, highly efficient fraud detection system, which can easily, in a transparent and operationally stable way be applied to the existing technologies in automated risk-transfer and insurance systems.

Another technical problem associated with automation in underwriting and claim handling is that there are a large number of features (individual measuring parameter, external or environmental measuring parameters, financial parameters, credit rating parameters, corporate structure parameters, market parameters) and rules/standards that underwriters must take into account in assessing possible systems request to one of several risk categories (or rate classes). With the large number of features, rules/standards and risk categories, it is very difficult and time consuming or even impossible, especially for human experts, to consider all of the information necessary to make a decision; furthermore, the results are often inadequate in terms of consistency and reliability. The inadequacy of this process becomes more apparent as the complexity of object or instrument applications increases. Thus, in risk-transfer, effective fraud detection requires rapid analysis of a plurality of claims parameters and data typically stored in multiple, heterogenous sources. Such claims parameter and characteristics data can be based not only on claims data but also on a wide variety of notes and documents associated with a risk-transfer claim. To farther complicate the issue, the typical large fluctuations of claim adjuster work-force leads to a knowledge drain as experience is quickly leaving the industry. On the other side, detection of the risk-transfer claims fraud and the subrogation potential claims is highly dependent on the expertise of the claim adjuster. In some situation, even the claim adjustor fails to identify the risk-transfer claims fraud and the subrogation potential claims, which can corrupt the operation of the risk-transfer system. In summary, risk-transfer claims frauds and missed subrogation potential claims can affect the proper operation of risk-transfer systems in two ways. Firstly, the balance between captured resources balancing acquired risk is corrupted and the automated operation is disabled, where the risk-transfer claim frauds and subrogation potential claims are not identified correctly, and secondly in investigating claims that may or may not be fraud or subrogation related by human expert is a slow process, which does not allow a real-time operation of an automated system, It is to be noted, that fraudulent activity can take many forms across the value chain of automated risk-transfer. The term "value chain", as used herein, is the set of processing steps, instrumental requirements and activities that systems or product/service processing plants, operating in a specific technology, use or perform in order to deliver a certain product (i.e., good and/or service). In the mist of industry 4.0 and the availability of huge personalized data, in particular telematics data, technological development trends to digital platforms and accelerated underwriting increase risk of misrepresentation by both insureds and agents. There is a need for a technical solution to automatically identify unusual and suspicious activity in real time. It is further to be noted, that such an automated fraud detection and trigger system cannot be contributed by a businessman within his framework of the abstract, self-contained business method to transfer risks, but needs a technical skilled person developing the technical device and system structures based on the technical requirements of the used electronic means for automated fraud detection.

A further critical point for the automated operation of risk-transfer typically involves consideration of one or more criteria, which are correlated to an event or events influencing the transferred risk. The ability to predict the frequency or likelihood of occurrences of such critical events is important in many technical applications. However, different risk-transfer systems often use different sets of trigger and measuring criteria to assess the expected occurrence of the same (or similar) events. In some cases, the same risk-transfer system may also use different criteria sets in differing situations or differing times. Especially, in the case of coupling first risk-transfer systems with a second risk-transfer system, such as a mutually synchronized insurance and reinsurance systems providing seamless risk transfer within a negotiated parameter range, the differing operation of the first risk-transfer systems makes it difficult or even impossible to use methods able to take such differences into account. In particular, these differences applied criteria make inter-system related monitoring and triggering for fraudulent activity technically extremely challenging. Thus, there is a demand for a reliable, automated fraud-detection system allowing to detect and monitor fraudulent activity across the different risk-transfer value chains entirely covering the different risk-transfer value chains.

None of the prior art system is able to completely solve the most important technical difficulties that arise from capturing, assessing, monitoring and triggering fraudulent activity, as discussed above. The prior art systems are not able to perform real-time identification of unusual and suspicious activity in e.g. application data. US 2016/0379309A1, US 2019/0213605A1, and US 2017/0124675A1 are examples of such prior art systems. US 2016/0379309A1 discloses a system for detecting possible occurrences of fraud in risk-transfer health claims. Historical claims data are obtained over a period of time. The fraud frequency rate and percentage loss rate for the risk-transfer system are assessed. The fraud frequency rate and percentage loss rate for the risk-transfer system are compared to risk-transfer industry benchmarks for the fraud frequency rate and the percentage loss rate. Based on the comparison to the industry benchmarks, the system determines whether to perform predictive modeling analysis if the risk-transfer system is within a first range of the benchmarks, to perform statistical analysis on the claim data if the risk-transfer system, is below the first range of the benchmarks or perform forensic analysis if the risk-transfer is above the first range of the benchmarks. Statistical analysis, predictive modeling or forensic analysis are then performed based on the benchmarks to determine possible occurrences of fraud within the risk-transfer claim data. US 2019/0213605A1 shows another system for detecting possible occurrences of fraud in risk-transfer claims, here related to vehicle risks. The system is able to measure the probability of warranty claims being fraudulent. Further, it includes determining the probability based on a predictive fraud detection model structure and one or more parameters measured and transmitted from the vehicle by means of diagnostic devices. The probability measure of fraud is signaled to an operator. US 2017/0124675A1 discloses still another prior art system for detecting fraudulent claims. This system automatically detects and quantifies fraudulent overcharges and penalties in captured claim data considering characteristics of metadata from a defined risk-transfer as boundary conditions by means of a parser module, a fraud detection module, and a quantifier module. The parser module parses the predefined risk-transfer characteristic data into a claim string, and parse the claim into plurality of monetary measure requests. A model generator generates a preliminary metrics associated with the claim string based on evaluation and to generate an optimal monetary measure for the claim. The quantifier module generate a fraudulent charge metric allowing to measure the plurality of monetary measure requests based on the monetary measure requests being a fraudulent claim.

SUMMARY OF THE INVENTION

It is an object of the present invention to provide an automated real-time fraud monitoring and detection system and method triggered by unusual and/or suspicious activities within a risk-transfer processing workflow based on pattern recognition and matching. The present invention should provide two processes, the first relating to automatically identifying/analyzing/flagging agent misconduct, and the second relating to automatically recognizing and analyzing abnormal pattern around use of social network data or the like. The first process should, inter alia, allow for (i) a proper analysis of underwriting decisions across the portfolio, (ii) identifying agents that are statistical outliers on a risk adjusted basis, (iii) flagging agents that are outliers and perform more thorough diligence on their submitted applications, and (iv) analyzing across several metrics: approvals, declines, self-disclosure, etc. The automated agent misconduct detection or recognition, as first process, is provided by realizing the 4 points i-iv (mentioned above), for example, by using of the below-described statistical anomaly identification based on metrics such as auto approval rates, auto decline rates, rate class distributions, self-disclosure metrics etc. and more (cf. FIG. 5). As discussed above, the second process related to the customer anomalous behavior identification is realized by using analysis of social networks and the like. Finally, the system should also be enabled to interconnect the two processes.

According to the present invention, these objects are in particular achieved by the features of the independent claims. In addition, further advantageous embodiments can be derived from the dependent claims and related descriptions.

According to the present invention, the above-mentioned objects related to the realization of an automated real-time fraud monitoring and detection are achieved by means of an automated system triggered by unusual and/or suspicious activities within a risk-transfer processing workflow based on pattern recognition and matching, in that the system comprises a first data structure for capturing a set of open claim parameters and data, wherein the claim parameters and data are extracted from associated risk-transfer underwriting and claim capturing data sources and/or systems, in that the system generates synthetic forms of social formation data and social formation metadata comprising at least data from microblogging services and/or social networking services. The social formation data and/or metadata can be based on filtering or scanning of formation data in all kind of data sources, such as social media data, behavioral data, social relationship data and interaction data, and the like. Technical measures of personal social of prior art systems often fail to assess clearly defined behaviors, measurements and measurable quantities of relationships that relate to specific events and/or time periods. The present invention can, thus, also be based on a new technical measure of social relationships, which is able to resolve these problems. As an embodiment variant, the used measure assesses the size and density of the social network, e.g. in a first measurement cycle restricted to the primary social network, contacts with acquaintances and others, adequacy of interaction and supportiveness of relationships, and crisis support. A hierarchical built-up or generated database allows flexible access to the measured data. Initial measurements of the quantities provide typically already a good inter-rater reliability, a high degree of temporal stability of close relationships, and good acceptability for use in large-scale measurements of individuals with differing social backgrounds.

In summary, social relationships are used with in the inventive system as an important measure and/or predictor quantity. It follows that human behavior and experiences can be better understood through the interplay and interaction between individuals and contextual factors. Therefore, the evaluation of psychosocial or systemic interventions and their intended process need an adequately applied measurements and methods considering the complexity and outcome factors of multiple person and counseling. Existing outcome measures that are generally applicable focus on social networks and their inter-relationship of the connected nodes/cells have major disadvantages, since most measures are customized to specific types of network systems such as families or friendships. Different or unusual types of social networks such as broader or loser constellations and relationships or short-term arranged groups for short-term and interventions cannot be measured. Comparisons between different social networks are additionally obstructed by the multitude of constructs, such as relationship climate, relationship functioning etc. of the different nodes, that are measured. Most of the scales are long and time-consuming in applications, which limits a scale's utility between clients and counselors. Some prior art measures focus on more or less stable network characteristics such as relationship culture (e.g. family relations etc.). Even though many measures are related to multi-node settings, most are only able to score the individual level, based on items addressing the starting person, rather than the perception of the network system as a whole. For the present application, a social system can be defined as a group of elements, such as individual persons, who are connected to each other by virtue of their relations. Members of social systems interact and communicate in certain ways in order to maintain their dynamic balance and functional abilities. As a self-regulating and autopoietic system they may use feedback-loops about their performances based on circular causality. Negative or positive feedback leads either to reducing or enhancing change. Repetitive interactions over time create, in turn, relatively stable structures. The interactive process of informational shift technically implies that measurable communication always occurs. In line with that, interaction and the quality of relational aspects contain more than verbal communication. The joint interactional reality is ruled by subjective experiences, beliefs, and categories, which may differ strongly between members, i.e. cells or nodes of a measured network. Individuals perceive and interpret any kind of stimuli, which in turn gives rise to a certain kind of also measurable behavior towards each other. In addition, as an extended embodiment variant with increased and measured collective efficacy depicts collective agency and functioning as based on the individuals' belief in the capability of the group to function as a whole. Group efficacy may exhibit a substantial influence measured on the quality of network functioning. The same holds true for organizational contexts. The inventive system has the advantage that it is able to capture dimensions of the measurable quality of a relationship relevant for systemic detections and interventions in the measured social network. So far, no prior art measure is applicable to different social systems, such as heterogenous group relationships, or working teams. The inventive system, inter alia, fills this gap. The scale can e.g. be designed to be highly economic to enable easy measurement in group and counseling settings. As an outcome measure, the measured quantity is technically structured to be sensitive to change in order to be used as a measuring system to trigger interactional interventions. As outlined above, the network, developed by the system, can be based on a systemic theory. Multi-perspectivity can thus be taken into account to reflect the systemic-constructivist structure that every network node/cell has its own interrelationship and perspective environment. The inventive system, thus, is able to provide a measure without normative presupposition of what constitutes a relationship.

However, unseen the technical measurement process defined herein, it is to be noted, that the network formations typically are based on relationship measurements and disclosures at the time of application. Each applicant (insured) may situate beneficiaries for their application. The beneficiaries may have their own individual applications and further have beneficiaries. It is this applicant (insured) to beneficiary relationship that is the basis of formation and/or detection of the connected networks. The system further comprises means for detecting and/or recognizing data associatable with one or more applicants and/or beneficiaries and/or agents, wherein each of the applicants and/or beneficiaries and/or agents are defined as a network node by a data record stored in a second data structure, and wherein the detected data associatable with the one or more applicants and beneficiaries data are assigned to the data record of the appropriate node, in that interconnected chains of nodes are formed as a network, the nodes being identified by the system based on the set of open claims parameter and data of the first data structure, the network being formed using a network analysis structure, and the nodes being interconnected by edges linking each node of the network with at least one other node of the network, and in that fraudulent networks are identified and monitored using connectivity and degree metrics, wherein nodes and edges of the network are varied by the system reflecting different attributes to provide qualitative assessment of the network.

Finally, in addition to the system as described above and the corresponding method, the present invention also relates to a computer program product that includes computer program code means for controlling one or more processors of the control system in such a manner that the control system performs the proposed method; and it relates, in particular, to a computer program product that includes a computer-readable medium containing the computer program code means for the processors.

BRIEF DESCRIPTION OF THE DRAWINGS

The present invention will be explained in more detail by way of example in reference to the drawings, in which:

In FIG. 1, there are 5 different networks denoted by the reference number 4. The 2 on the far left are examples of fraudulent networks and the 3 to the right are non-fraudulent network examples.

DETAILED DESCRIPTION OF THE PREFERRED EMBODIMENTS

Figure 1:
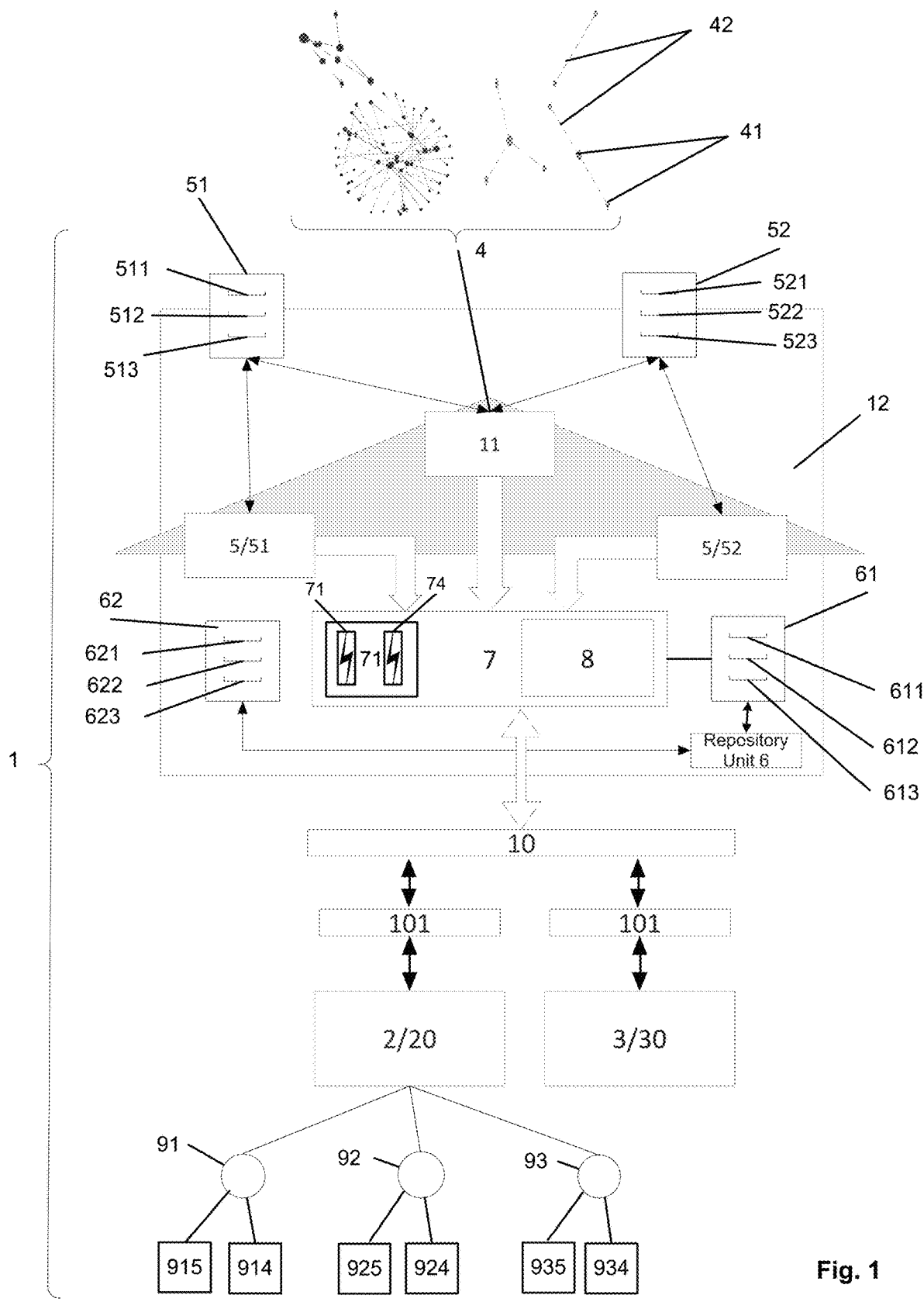
FIG. 1 shows a block diagram schematically illustrating an exemplary automated real-time fraud monitoring and detection system 1 triggered by unusual and/or suspicious activities within networks 4 having nodes 41 interconnected by edges 42 based on captured synthetic forms of social formation data and social formation metadata comprising at least data from microblogging services and/or social networking services by means of pattern recognition and matching.
Figure 2:
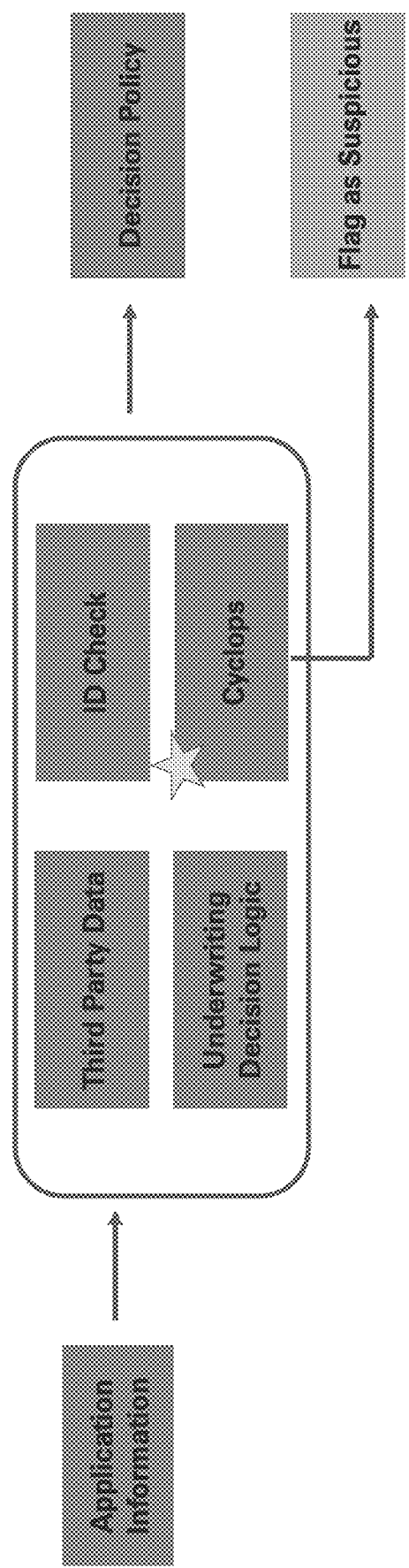
FIG. 2 shows block diagrams schematically illustrating the application process. The part surrounded by a line illustrates the underwriting process. The fraudulent activity can take many forms across the risk-transfer value chain. The inventive solution is able to identify unusual and suspicious activity in real time using patterns in application data.
Figure 3:
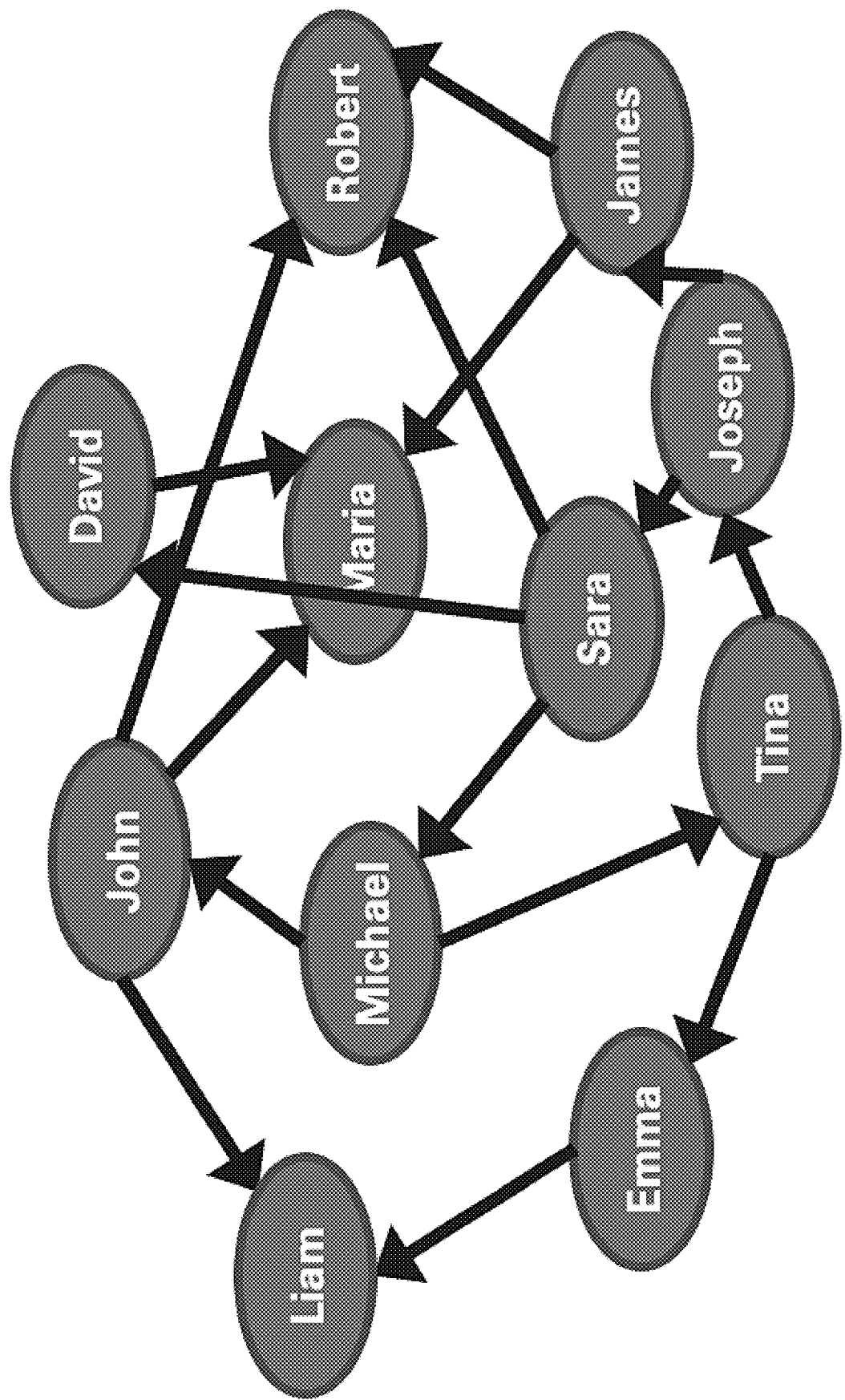
FIG. 3 show block diagrams schematically illustrating the structure of the applied social network analysis used to identify organized groups of individuals attempting fraud. The network is formed by connecting attributes of groups of people intending to benefit from the claim process by using examples, such as (i) common names, (ii) address similarities, (iii) insureds, and iv) beneficiaries. The network is formed by representing a "connected component". A connected component is defined as the entire set of insureds and beneficiaries that are connected to each other in a graph through intermediary nodes representing direct or indirect Insured-Beneficiary relations. For example, in FIG. 3, Sara is not directly connected to Liam. Sara is indirectly connected to Liam as follows: Sara→Michael→Tina→Emma→Liam.
Figure 4:
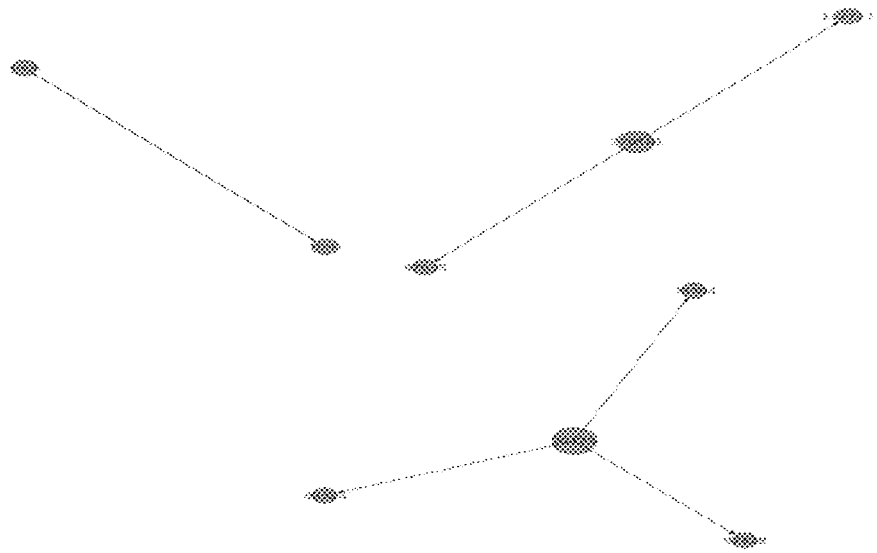
FIG. 4 show block diagrams illustrating a schematic illustration of non-fraudulent networks, and fraudulent networks. It is to be noted that agents are not network nodes. The nodes represent either applicants (insureds) or beneficiaries and are a part of the inventive social network analysis technique used to identify customer fraud only.
Figure 4:
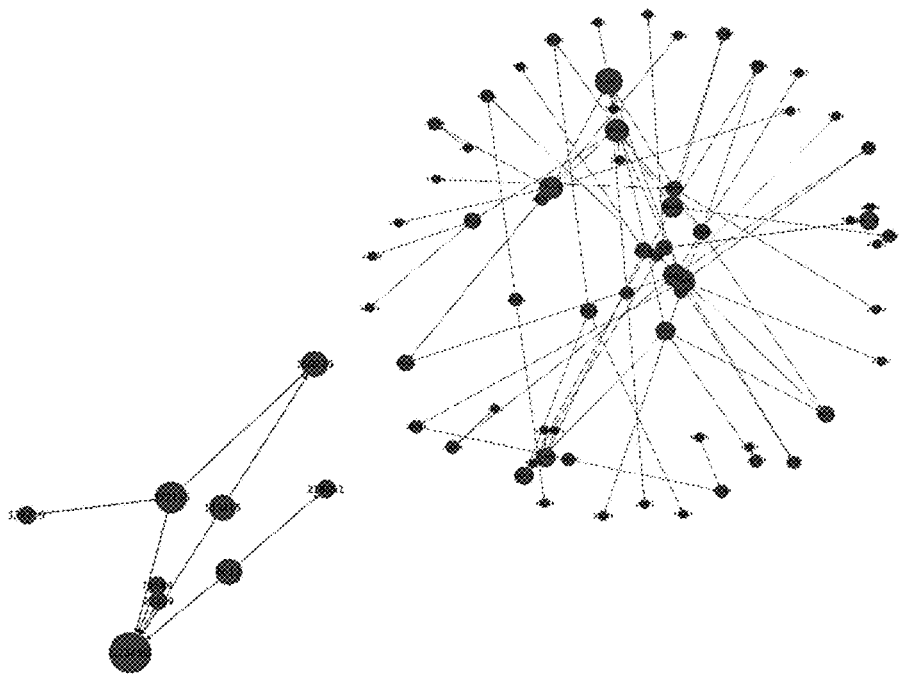
Figure 5:
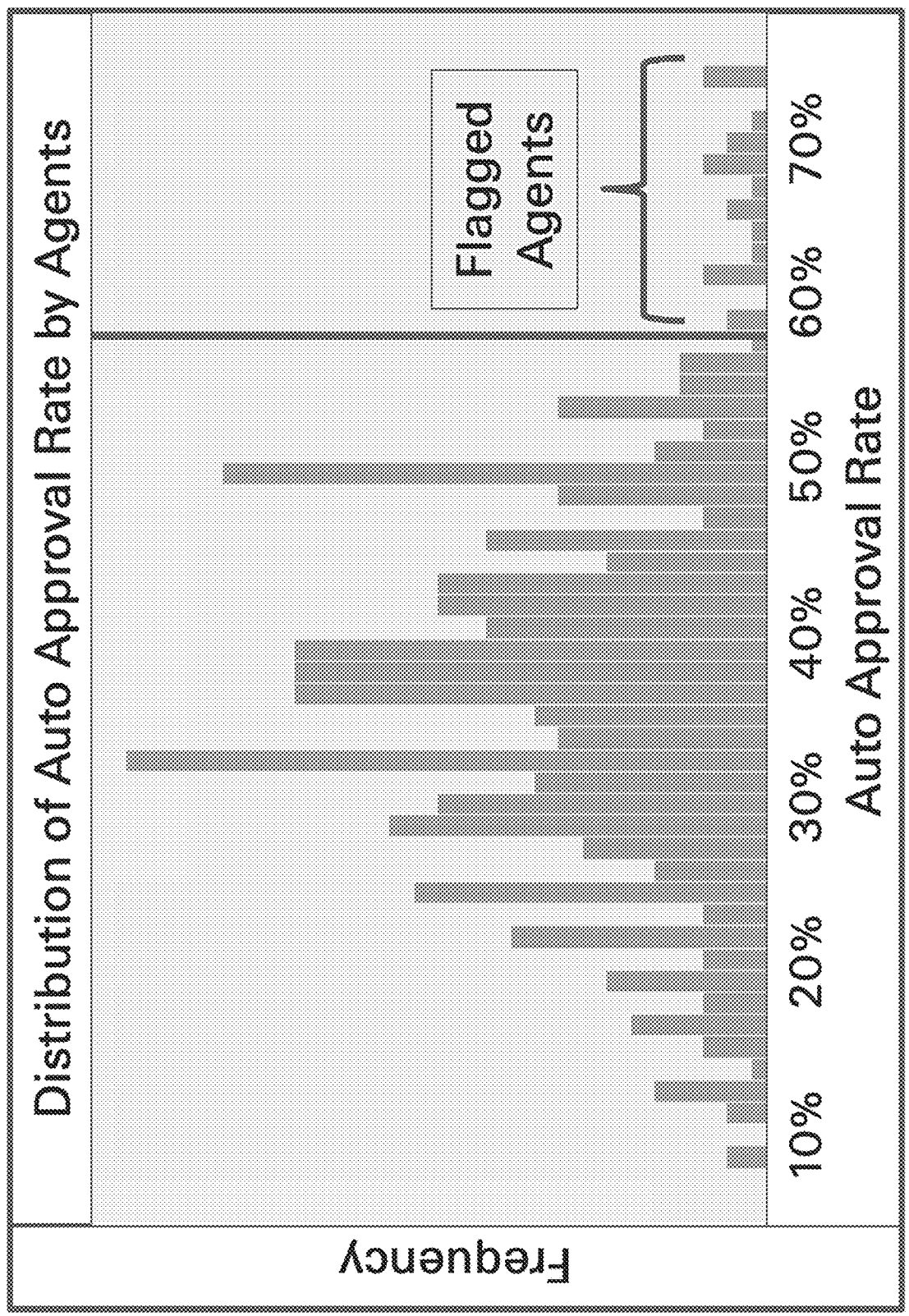
FIG. 5 shows a block diagram schematically illustrating the use of the statistical analysis structure to determine outliers and flag agents who are engaging in potentially fraudulent activity. The solution is able to perform the monitoring of underwriting decisions across the portfolio and identify agents that are statistical outliers on a risk adjusted basis. Further, the system flags agents that are outliers, thus providing the basis to perform more thorough diligence on these submitted applications. In particular, the inventive structure can be used across several metrics, as approvals, declines, self-disclosure, etc.

FIG. 1 schematically illustrates an architecture for one possible implementation of an embodiment of the automated real-time fraud monitoring and detection system 1, as well as an architecture for a possible implementation of an embodiment in an automated system 1 comprising a first automated insurance system 2 and/or a second insurance system 3 with associated first and second electronically automated resource pooling systems 20/30 for risk sharing of risks 9 of a variable number of risk-exposed individuals 91, 92, 93. The automated real-time fraud monitoring and detection system 1 detects unusual and/or suspicious activities within a risk-transfer processing workflow based on pattern recognition and matching. The system 1 comprises a first data structure 61 for capturing a set of open claim 611 and underwriting 612 parameters and data and application data 613. The claim and underwriting parameters and data 611/612 are extracted from associated risk-transfer underwriting 51 and claim data sources 52 and/or capturing systems.

As a variant, the one or more associated claim capturing data sources and/or systems 5/51/52 are e.g. realized as an integrated part of the system 1. In this case, the system 1 can e.g. comprise a data-transmission network 11 comprising secured communication channels linked on one side to client-devices 915, 925, 935 each comprising a graphical user interface for inputting claim data and on the other side to the automated claim capturing data source of the system for capturing claim data transmitted form the client device 915, 925, 935 over the secure communication channel, and wherein the claim data comprise digitized multimedia-data. Regarding the detection of customer level fraud, as mentioned above, the data that is being used for the purposes of creating these monitoring flags are not merely representative of social networks in the sense of social media platform data. The inventive social network analysis is performed by analyzing the connectivity of applicants (insureds) and beneficiaries. This makes use of application time data when an applicant (insured) filling out an application may situate n number of beneficiaries. Regarding the detection of agent level fraud, on the other side, the automated agent level fraud detection relies on the use of application/underwriting/self-disclosure/claims level data to statistically identify anomalous and deviant behavior. All this data can comprise any kind of data and multimedia-data. The multimedia-data can e.g. comprise digital text and/or image data automatically recognized by the automated application/underwriting/claim data capturing data source, wherein recognized parts of the transmitted multimedia-data are assigned to the set of open claim parameters and data 611 of the first data structure as extracted and recognized claim parameters and data. The data and multimedia data can comprise social data, in particular social network data, for example derived from microblogging services as e.g. the online broadcast medium Twitter and/or Tumblr and/or FriendFeed and/or Plurk and/ or Jaiku and/or identi.ca and/or Sina Weibo and/or Tencent Weibo. However, said data and multimedia data can also comprise any kind of social formation data, such as social media, behavioral, social relationship and interaction data. The microblogging services can e.g. comprise, besides the web-based interfaces, alternative publishing entries including text messaging and/or instant messaging and/or electronic mail and/or digital audio and/or digital video. The social networking services at least can e.g. comprise Facebook and/or MySpace and/or LinkedIn and/or Diaspora and/or JudgIt and/or Yahoo Pulse and/or Google Buzz and/or Google+ and/or XING. The social networking services can e.g. further comprise micro-blogging feature implemented as status updates features.

In addition or alternatively, the one or more associated risk-transfer underwriting sources and/or systems can also be realized as an integrated part of the system 1. In this case, the system 1 can e.g. comprise a data-transmission network 10 comprising secured communication channels linked on one side to client-devices each comprising a graphical user interface for inputting underwriting data and on the other side to the automated underwriting capturing data source of the system 1 for capturing underwriting data transmitted form the client device over the secure communication channel, and wherein the underwriting data comprise digitized multimedia-data.

The system 1 generates synthetic forms of social data (in particular social network data) and social metadata comprising at least data from microblogging services and/or social networking services. The system 1 comprises means for detecting and/or recognizing data associatable with one or more claim applicants 411 and/or beneficiaries 412 and/or agents 413 and assigning the detected data to network nodes 41 or network edges 42. The detected social data and metadata are stored in corresponding data records 621 of a second data structure 62, a network node 41 representing a claim applicant 411 or beneficiary 412 or agent 413 and a network edge 42 representing a link between a claim applicant 411 and beneficiary 412 or a claim applicant 411 and an agent 413 or a beneficiary 412 and an agent 413. For example, the chains can e.g. be formed by using node triggers 74 identifying groups of nodes 42 having motive characteristics to abuse the system and/or benefit from the claim process, wherein the node triggers 74 trigger the data of the first and/or second data structure 61/62 based on trigger values 72 indicating motive characteristics to abuse the system and/or benefit from the claim process. The trigger values of the node triggers 74 can e.g. be dynamically adapted by a machine-learning or artificial intelligence-based unit 73 based on the dynamically captured data of the first and/or second data structure 61/62.

Chains of nodes 41 interconnected by edges 42 are formed as a network structure 4 by means of a network engine 11 based on the data of the first and second data structure 61/62, the network 4 being formed using a network analysis structure, wherein the nodes 41 are interconnected by edges 42 linking each node 41 of the network structure 4 with at least one other node 41 of the network structure 4. The network analysis formulations used can e.g. be realized as centrality and/or in-degree and/or out-degree and/or density. For example, the network 4 can e.g. be formed by connecting attributes of groups of people intending to benefit from the claim process based on trigger characteristics comprising common names and/or address similarities and/or insured identities and/or beneficiary identities. The system in a first step can e.g. detect any node 42 which is beneficiary for at least n different nodes 42 representing applicants, and in a second step, if the networks 4 are formed, networks 4 are flagged if more than m unique last names are detected.

The social network analysis, as proposed herein, is the process of investigating social structures through the use of networks and graph technologies. It characterizes networked structures in terms of nodes (individual actors, people, or things within the network and the ties, edges, or links (relationships or interactions) that connect them. These networks can e.g. be visualized through sociograms in which nodes are represented as points and ties are represented as lines. These visualizations provide a means of qualitatively assessing networks by varying the visual representation of their nodes and edges to reflect attributes of interest. In the inventive system, network connectivity and degree metrics can e.g. be used to identify potentially fraudulent networks. The technical formulations for the graph techniques can e.g. be given by:

$$\text{Connectivity}_i(M) = \sum_j M_{ij}$$

$$K_i(M) = \frac{\text{Connectivity}_i(M)}{\max_i(\text{Connectivity}_i(M))}$$

$$\text{Density }(M) = \frac{\sum_k \sum_j M_{ij}}{n(n-1)}$$

$$MAR_i(M) = \frac{\sum_j (M_{ij})^2}{\sum_j M_{ij}}$$

$$\text{Centralization }(M) = \frac{n}{n-2}\left(\frac{\max_i(\text{Connectivity}_i(M))}{n-1} - \text{Density }(M)\right)$$

$$\text{Heterogeneity }(M) = \sqrt{\frac{n\left(\sum_i \sum_j \sum_k M_{ij} M_{ik}\right)}{\left(\sum_i \sum_j M_{ij}\right)^2} - 1}$$

$$\text{ClusterCoef}_i(M) = \frac{\sum_j \sum_k M_{ij} M_{jk} M_{ki}}{\sum_j \sum_k M_{ij} B_{M,ik} M_{ki}}$$

$$\text{NetworkSignif}(G) = \frac{\sum_i G_i}{n}$$

$$\text{HubGeneSignif}(M, G) = \frac{\sum_i G_i K_i(M)}{\sum_i (K_i(M))^2}$$

It is to be noted that the equations and formulations provide above are not all the formulations possible. For example, unsupervised learning can be added based and deep learning based algorithms to quantify a network and its nodes and edges etc. To exemplify social networks connectivity, the network may, for example, be formed, as a variant, in a qualifying 6 degree of freedom structure/reality. Though this may not be used as an empirical fact, this allows to demonstrate the quantifying social network analysis. As a further variant for this example, for downlink precoding for constructing the multi-cell networks, e.g. transmitters can be provided by the system with measured or captured channel state information, which can also be imperfect due to possibly limited information about the linkings within the multi-cell (multi-node) networks, i.e. between two or more network nodes/cells, where still the network structure is given by the networking nodes/cells (individual actors, people, or things within the network and the ties, edges, or links (relationships or interactions) that connect them. Specifically, each transmitter assigned to a linkage between two cells/nodes can be provided with a channel tie estimate with the strength of the tie being specific to each channel/linkage between two nodes. Considering or weighting the impact of the generated or measured strength of the tie during the network exchange on the rate performance achieved by the specific multi-cell social network. It is important to note that a measured and/or weighted tie strength can dramatically degrade the network performance based on the used precoding generation.

Fraudulent networks 4 are identified, flagged 43 and monitored by a network trigger unit 72 using connectivity and degree metrics to trigger on network structures 4 indicative of fraudulent and/or suspicious activities. The system 1 can e.g. use a statistical analysis process to determine outlier nodes 41 representing agents, where detected outliner nodes 41 are flag as agents engaging in potentially fraudulent activity. The statistical analysis process to determine outlier nodes 41 can e.g. be performed on underwriting decisions across the portfolio. Nodes 41 representing agents can e.g. be flagged if they are identified as statistical outliers on a risk adjusted basis. More thorough diligence on their submitted applications can e.g. be triggered by the system 1, if a node 41 representing an agent is flagged by the system 1. The statistical analysis process can e.g. be performed by the system 1 across several metrics. The several metrics can e.g. comprise at least approvals and/or declines and/or self-disclosure. Further, the system 1 can e.g. comprise a pattern-recognition unit 8 based on machine-learning or artificial intelligence. Identified network structures 4 indicative of fraudulent and/or suspicious activities are used in a learning phase of the pattern-recognition unit 8, and in an operation phase of the pattern-recognition unit 8 the identification of fraudulent networks 4 is performed by the pattern-recognition unit 8 using the network structure 4 as input parameters.

As a variant, the pattern-recognition unit 8 can further perform the steps of: (i) determining a plurality of nodes 41 and edges 42 based on the data of the first and second data structure 61/62, in particular the application 613, underwriting 621 and claim 611, the nodes 41 being interconnected by edges 42 to form different networks 4, (ii) determining one of more operational modus variables of each open claim set, the operational modus variables indicative of motives to abuse the system and/or benefit from the claim process, (iii) determining a match between the one or more operational modus variables and a claim in the sets of open claims, (iv) generating a list of suspected fraudulent claims that comprises each matched claim, (v) implementing one or more machine learning algorithms to learn a fraud signature pattern in the list of suspected fraudulent claims, and (vi) grouping the set of open claims data based on the fraud identifying and flagging fraudulent applicants and/or beneficiaries and/or agents.

In the context of the present invention, it is important to understand that the customer level and agent level fraud analytics are provided by 2 different structures that comprise the larger structure of system 1. In the present invention, customer originating fraud is being captured using social network analysis and quantifying the links between applicants (insureds) and beneficiaries that create a connected component or a network. The background for the technical need for such automated fraud detection systems lies in the fact that, today, industry is threatened by nomadic groups that try to take advantage of expedited underwriting by buying risk-transfer (insurance) policies and putting in claims where there is lack of insurable interest. A lot of times, individual policyholders from these nomadic groups will situate many beneficiaries from their group. These beneficiaries may have beneficiaries of their own. It seems that this networked act is aimed to maximize probability of profit in the event a claim comes through. When the densities of such networks exceed a normal range, when the networks contain last names that are associated with commonly occurring and commonly flagged fraudulent nomadic last names in the industry, or when the system 1 too many different nomadic last names within a network which again signals to lack of insurable interest, the system assigns a flag.

According to the present invention, agent level fraud is detected using unsupervised machine learning and cluster analysis to first risk-adjust the agent population and then statistically identify abnormal and fraudulent behavior across many metrics including e.g. Auto Approval rate, Auto Decline rates, Rate Class distributions, self-disclosure distributions, and the like. The expectation is that all agents will have some value for the above metrics. Agents may perpetrate potential fraud since they may have the incentive to do so in order to capture higher sales or commission benefits. For example, considering a population of agents approves applications 75% of the time: If an agent is registering numbers far higher than 75%, it could be a sign that the agent is potentially engaging in riskier risk transfer in order to meet sales, commission and bonus criteria. These kind of abnormalities in agent selling behavior is what the system is enabled to capture by its inventive technical structure.

As an embodiment variant the nodes 41 and edges 42 of the network 4 can e.g. be varied by the system 1 reflecting different attributes to provide qualitative assessment of the network 1. As a further variant, if one fraudulent node 42 is identified in a selected network 4 all the other nodes 42 can e.g. be flagged also to be processed further for fraudulent activities.

As already mentioned above, the system 1 can e.g. comprise one or more first risk transfer systems 2 to provide a first risk transfer based on first risk transfer parameters 211, 212, 213 from a plurality of risk-exposed individuals 91, 92, 93 to the first risk transfer system 2. The claim applicants are a part of the risk-exposed individuals 91, 92, 93, wherein the first risk transfer system 2 comprises a plurality of payment transfer modules 22 configured to receive and store 23 first payment parameters 221, 222, 223 associated with risk transfer of risk exposures 9 of said risk-exposed individuals 91, 92, 93 for pooling of their risks 913, 923, 933. The system 1 can e.g. further comprise a second risk transfer system 3 to provide a second risk transfer based on second risk transfer parameters 311, 312, 313 from one or more of the first risk transfer systems 2 to the second risk transfer system 3. The second risk transfer system 3 comprises second payment transfer modules 31 configured to receive and store 32 second payment parameters 321, 322, 323 for pooling of the risks 9 of the first risk transfer systems 2 associated with risk exposures transferred to the first risk transfer systems 2. The second risk transfer parameters 211, 212, 213 and correlated second payment transfer parameters 311, 312, 313 can e.g. be generated by means of a machine learning-based control circuit and transmitted to the second risk transfer system 3, wherein the occurred is at least partly covered by the second insurance system 3 based on the second risk transfer parameters 311, 312, 313 and correlated second payment transfer parameters (321, 322, 323). The payments transferred to the first and/or second risk-transfer systems 2/3 can e.g. be pooled by associated automated resource pooling systems 20/30. Resource pooling systems 20/30 are systems for automated pooling of resources, e.g., electronically poolable monetary parameters, from assigned risk-exposed individuals 91, 92, 93, thereby transferring a defined individual risk 913, 923, 933 or portions of the total risk 9 associated with the risk-exposed individuals 91, 92, 93, ..., to the resource pooling systems 20/30, wherein the operation of the transferred risk is defined by first and second risk transfer parameters 211, 212, 213/311, 312, 313, as for example set using predefined risk transfer policies, and wherein in case of triggering of the occurrence of the defined life risk at a risk-exposed individual 91, 92, 93, ..., a loss 917, 927, 937 of the concerned risk-exposed individual 91, 92, 39, ... is distinctively covered by the resource pooling systems 20/30 by triggering the specific transfer of resources from the resource pooling system 20/30 to the affected risk-exposed individual 91, 92, 93, ... The operation of the system 1 will be described in the following: The first and second risk transfer parameters 211, 212, 213/311, 312, 313, can for example comprise parameters defining physical measuring parameters to detect the occurrence of a risk event at the risk-exposed individual 91, 92, 93, by means of the system 1 and/or time- or amount-related threshold values. The risk-exposed individuals 91, 92, 93, .... can be any type of person or unit associated with a risk 9. A risk is related to the probability for the occurrence of a risk event in relation to risk-exposed individuals 91, 92, 93, e.g. a health risk or an accident risk etc. etc. The automated system 1 includes at least a processor and associated memory modules. The operation of the system 1 is dynamically controlled, monitored and steered by the control module 12, in particular generating appropriate signaling and steering the activation and interworking of the various components of the automated system 1. The automated system 1 can also include one or more display units and operating elements, such as a keyboard, and/or graphic pointing or position capturing devices, such as a computer mouse. The system 1 is a technical device comprising electronic means that can be used in the field of automated risk transfer or insurance technology with regard to risk transfers that can be related to different kind of risks 9, as e.g. health risks, accident risks, catastrophic risks, etc. The invention seeks to technically capture, manage and automate complex related operations of monitoring fraudulent activities in the claim and underwriting process in the risk-transfer industry.

LIST OF REFERENCE NUMERALS

1 Fraud monitoring and detection system
11 Network engine
2 First insurance system (primary insurance system)
20 First electronically automated resource-pooling system
21 Payment transfer modules
211, 212, 213 First risk transfer parameters
221, 222, 223 First payment parameters
22 Secured data store
3 Second insurance system (reinsurance system)
30 Second electronically automated resource-pooling system
31 Payment transfer modules
311, 312, 313 Second risk transfer parameters
321, 322, 323 Second payment parameters
32 Secured data store
4 Networks
41 Network nodes
411 Claim applicants
412 Claim beneficiaries
413 Agents
42 Edges
43 Flag flagging fraudulent networks
5 Data sources and systems
51 Risk-transfer underwriting data sources and/or data capturing systems
52 Claim data sources and/or data capturing systems
6 Repository unit
61 First data structure
611 Claim parameter and data
612 Underwriting parameter and data
613 Application parameter and data
62 Second data structure
621 Data records each storing a network node
7 Trigger module
71 Network trigger unit
72 Trigger parameters
73 Machine-learning based unit adapting trigger values
74 Node triggers
8 Machine-learning based pattern-recognition module
9 Total risk exposure
91, 92, 93 Risk exposed individuals or units
911, 921, 931 Captured risk-related individual data
912, 922, 932 Likelihood of risk exposure of the pooled risk exposed individuals
913, 923, 933 Individual risk of a risk exposed individual
914, 924, 934 Capturing or measuring devices
915, 925, 935
10 Data transmission network
101 Data interface

The invention claimed is:

1. An automated real-time fraud monitoring and detection system triggered by unusual and/or suspicious activities within a data processing workflow based on pattern recognition and matching, the automated real-time fraud monitoring and detection system comprising:
  processing circuitry configured to
    capture, in a first data structure, a set of claim parameters and data, underwriting parameters and data, and application parameters and data, the data comprising digitized multimedia-data, and the claim and underwriting parameters and data being extracted from associated risk-transfer underwriting and claim data sources and/or capturing systems, the digitized multimedia-data comprising data extracted from microblogging services and/or social networking services by the system from social network data comprising recognized social formation data, social media data and/or social relationship data and/or behavioral data and/or interaction data, based on relationship disclosures from the application parameters and data captured at a time of application,
    generate synthetic forms of social formation data and social formation metadata comprising at least the social media data and/or behavioral data and/or social relationship data and/or interaction data,
    detect and/or recognize data associatable with one or more claim applicants and/or beneficiaries and/or agents and assign the detected data to network nodes or network edges, the social data and metadata being stored in corresponding data records of a second data structure, a network node representing a claim applicant or beneficiary or agent and a network edge representing a link between a claim applicant and beneficiary or a claim applicant and an agent or a beneficiary and an agent, chains of the nodes interconnected by the network edges are formed as a network structure by a network engine based on the data of the first data structure and the second data structure, the network being formed using a network analysis structure, the network nodes being interconnected by edges linking each node of the network structure with at least one other node of the network structure, and identify, flag, and monitor fraudulent networks using connectivity and degree metrics to trigger on network structures indicative of fraudulent and/or suspicious activities, the chains of the nodes being formed by node triggers of the system identifying groups of nodes having motive characteristics to abuse the system and/or benefit from a claim process, wherein the node triggers trigger the data of the first data structure and/or the second data structure based on trigger values indicating motive characteristics to abuse the system and/or benefit from the claim process, the trigger values of the node triggers being dynamically adapted by a machine-learning-based process based on dynamically captured data of the first data structure and/or the second data structure.

2. The automated real-time fraud monitoring and detection system according to claim 1, wherein the network nodes and edges of the network structure are varied by the system reflecting different attributes to provide qualitative assessment of the network.

3. The automated real-time fraud monitoring and detection system according to claim 1, wherein the network analysis structure used is centrality and/or in-degree and/or out-degree and/or density.

4. The automated real-time fraud monitoring and detection system according to claim 1, wherein the processing circuitry is configured to perform a pattern-recognition process based on machine-learning or artificial intelligence, wherein identified network structures indicative of fraudulent and/or suspicious activities are used in a learning phase of the pattern-recognition process, and wherein in an operation phase of the pattern-recognition process the identification of fraudulent network structures is performed by the pattern-recognition process using the network structure as input parameters.

5. The automated real-time fraud monitoring and detection system according to claim 4, wherein the pattern-recognition process further performs:

determining a plurality of the nodes and edges based on the data of the first and second data structure, the nodes being interconnected by edges to form different network structures, determining one of more operational modus variables of each set of claim parameters and data, the operational modus variables indicative of motives to abuse the system and/or benefit from a claim process, determining a match between the one or more operational modus variables and a claim in the sets of open claims, generating a list of suspected fraudulent claims that comprises each matched claim, implementing one or more machine learning algorithms to learn a fraud signature pattern in the list of suspected fraudulent claims, and grouping the set of open claims data based on the fraud identifying and flagging fraudulent applicants and/or beneficiaries and/or agents.

6. The automated real-time fraud monitoring and detection system according to claim 1, wherein when one fraudulent node is identified in a selected network structure, all the other nodes are also flagged to be processed further for fraudulent activities.

7. The automated real-time fraud monitoring and detection system according to claim 1, wherein the network structure is formed by connecting attributes of groups of people intending to benefit from a claim process based on trigger characteristics comprising common names and/or address similarities and/or insured identities and/or beneficiary identities.

8. The automated real-time fraud monitoring and detection system according to claim 1, wherein the processing circuitry is configured to detect any node which is beneficiary for at least n different nodes representing applicants, and, when the networks structures are formed, flag the network structures when more than m unique last names are detected.

9. The automated real-time fraud monitoring and detection system according to claim 1, wherein the processing circuitry is configured to use a statistical analysis process to determine outlier nodes representing agents, where detected outliner nodes are flagged as agents engaging in potentially fraudulent activity.

10. The automated real-time fraud monitoring and detection system according to claim 9, wherein the statistical analysis process to determine outlier nodes is performed on underwriting decisions across a portfolio.

11. The automated real-time fraud monitoring and detection system according to claim 8, wherein nodes representing agents are flagged when identified as statistical outliers on a risk adjusted basis.

12. The automated real-time fraud monitoring and detection system according to claim 9, wherein the processing circuitry is configured to trigger more thorough diligence on submitted applications, when a node representing an agent is flagged by processing circuitry.

13. The automated real-time fraud monitoring and detection system according to claim 9, wherein the statistical analysis process is performed by the processing circuitry across several metrics.

14. The automated real-time fraud monitoring and detection system according to claim 13, wherein the several metrics comprise at least approvals and/or declines and/or self-disclosure.

15. The automated real-time fraud monitoring and detection system according to claim 1, further comprising:

a data-transmission network comprising secured communication channels linked on one side to client devices each comprising a graphical user interface for inputting claim data and on an other side to an automated claim capturing data source of the system for capturing claim data, which is digitized multimedia-data, transmitted from a client device, of the client devices, over a secure communication channel, of the secure communication channels, wherein the risk-transfer underwriting and claim data sources and/or capturing systems are an integrated part of the system.

16. The automated real-time fraud monitoring and detection system according to claim 15, wherein the transmitted multimedia-data comprise at least digital text and/or image data automatically recognized by the automated claim data capturing data source, wherein recognized parts of the transmitted multimedia-data are assigned to the set of claim parameters and data of the first data structure as extracted and recognized claim parameters and data.

17. The automated real-time fraud monitoring and detection system according to claim 16, wherein the transmitted multimedia-data comprises microblogging services, which comprise at least online broadcast medium Twitter and/or Tumblr and/or FriendFeed and/or Plurk and/or Jaiku and/or identi.ca and/or Sina Weibo and/or Tencent Weibo.

18. The automated real-time fraud monitoring and detection system according to claim 17, wherein the microblogging services comprise, besides web-based interfaces, alternative publishing entries including text messaging and/or instant messaging and/or electronic mail and/or digital audio and/or digital video.

19. The automated real-time fraud monitoring and detection system according to claim 16, wherein the transmitted multimedia-data comprises social networking services comprising at least Facebook and/or MySpace and/or LinkedIn and/or Diaspora and/or JudgIt and/or Yahoo Pulse and/or Google Buzz and/or Google+ and/or XING.

20. The automated real-time fraud monitoring and detection system according to claim 19, wherein the social networking services further comprise micro-blogging feature implemented as status updates features.

21. The automated real-time fraud monitoring and detection system according to claim 1, further comprising:
a data-transmission network comprising secured communication channels linked on one side to client devices each comprising a graphical user interface for inputting underwriting data and on an other side to an automated underwriting capturing data source for capturing underwriting data, which comprise digitize multimedia-data, transmitted form a client device, of the client devices, over a secure communication channel, of the secure communication channels, wherein the risk-transfer underwriting and claim data sources and/or capturing systems are an integrated part of the system.

22. The automated real-time fraud monitoring and detection system according to claim 1, further comprising:
one or more first risk transfer systems to provide a first risk transfer based on first risk transfer parameters from a plurality of risk-exposed individuals to the first risk transfer system, wherein the claim applicants are a part of the risk-exposed individuals, wherein the first risk transfer system comprises a plurality of payment transfer modules configured to receive and store first payment parameters associated with risk transfer of risk exposures of the risk-exposed individuals for pooling of their risks.

23. The automated real-time fraud monitoring and detection system according to claim 22, further comprising:
a second risk transfer system to provide a second risk transfer based on second risk transfer parameters from one or more of the first risk transfer systems to the second risk transfer system, wherein the second risk transfer system comprises second payment transfer modules configured to receive and store second payment parameters for pooling of the risks of the first risk transfer systems associated with risk exposures transferred to the first risk transfer systems.

24. The automated real-time fraud monitoring and detection system according to claim 23, wherein the second risk transfer parameters and correlated second payment transfer parameters are generated by a machine learning-based control circuit and transmitted to the second risk transfer system, wherein occurred loss is at least partly covered by the second risk transfer system based on the second risk transfer parameters and correlated second payment transfer parameters.

25. The automated real-time fraud monitoring and detection system according to claim 24, wherein the first and second risk transfer parameters and the correlated first and second payment transfer parameters are dynamically adapted and/or optimized by the machine learning-based control circuit based on captured risk-related individual data and based on the pooled risks of the first risk transfer systems.

26. The automated real-time fraud monitoring and detection system according to claim 25, wherein the first and second risk transfer parameters and the correlated first and second payment transfer parameters are dynamically adapted and/or optimized by the machine learning-based control circuit, further based upon measuring cost impact of the measured and monitored fraudulent activities.

27. The automated real-time fraud monitoring and detection system according to claim 1, wherein the processing circuitry is configured to generate synthetic forms of the social formation data and social formation metadata being based on relationship disclosure data captured at the time of application comprising at least the social media data and/or behavioral data and/or social relationship data and/or interaction data at least partially captured from the application data and parameters and/or microblogging services and/or social networking services.

28. The automated real-time fraud monitoring and detection system according to claim 27, wherein the social formation data and social formation metadata are based on relationship disclosures at the time of application captured from the application data and parameters, wherein each applicant situate beneficiaries for a respective application, and each of the beneficiaries having individual applications and further beneficiaries, an applicant to beneficiary relationship being a basis of formation of the network structure.

* * * * *